United States Patent [19]
Tomiyama

[11] Patent Number: 5,165,082
[45] Date of Patent: Nov. 17, 1992

[54] METHOD FOR WRITING SERVO SIGNALS ON A SERVO DISK IN A MAGNETIC DISK APPARATUS

[75] Inventor: Kazunobu Tomiyama, Nagano, Japan
[73] Assignee: Jujitsu Limited, Kawasaki, Japan
[21] Appl. No.: 403,499
[22] Filed: Sep. 6, 1989

[30] Foreign Application Priority Data

Sep. 20, 1988 [JP] Japan .................. 63-233716

[51] Int. Cl.⁵ ............................................ G11B 27/10
[52] U.S. Cl. .......................... 360/77.02; 360/77.05
[58] Field of Search ...................... 360/77.02, 77.05

[56] References Cited

U.S. PATENT DOCUMENTS

| | | | |
|---|---|---|---|
| 4,028,535 | 6/1977 | Franaszek et al. .................. | 364/572 |
| 4,577,240 | 3/1986 | Hedberg et al. .................... | 360/22 |
| 4,636,885 | 1/1987 | Yamada et al. | |
| 4,636,900 | 1/1987 | Tung et al. ......................... | 360/124 |
| 4,682,253 | 7/1987 | Leslie . | |
| 4,724,495 | 2/1988 | Hedberg et al. .................... | 360/22 |

OTHER PUBLICATIONS

Takehito Yamada, Disc Device, Patent Abstracts of Japan, vol. 11, No. 183, Jan. 21, 1987, Japan (JP-A-62-12970).
Shigemasa Yoshida, Servo Disc, Patent Abstracts of Japan, vol. 5, No. 9, Oct. 31, 1980, Japan (JP-A-55-139639).
European Search report for EP-89-11-7278, the Hague, (Apr. 11, 1990).

Primary Examiner—Joseph L. Dixon
Assistant Examiner—David L. Robertson
Attorney, Agent, or Firm—Staas & Halsey

[57] ABSTRACT

Servo data to be stored on a servo disk in a magnetic recording apparatus for positioning a data head of the magnetic recording apparatus to a data disk of the magnetic recording apparatus, are formed in a train of four servo bytes arranged in accordance with four clock bits successively received. Each servo byte consists of a clock bit and a group of positional bits respectively, where the positional bit is set making a definite time space from the clock bit. The four definite time spaces of the corresponding positional bit in the four servo bytes make an arithmetic progression, in which the initial term is the definite time space of the positional bit in the first servo byte and the common difference is the time difference between two corresponding positional bits in two adjacent servo bytes. The time difference and a length of a gate pulse in which servo data signals are demodulated, are set, for example, to 20 ns and 160 ns, respectively.

23 Claims, 10 Drawing Sheets

METHOD FOR WRITING SERVO SIGNALS ON A SERVO DISK IN A MAGNETIC DISK APPARATUS

BACKGROUND OF THE INVENTION (1) Field of The Invention

The present invention relates to writing servo signals on a servo disk in a magnetic disk apparatus.

The data heads which write and read data are regularly positioned on a designated track on a data surface of a data disk by reading the servo signals previously written an the servo disk. This is called closed loop servo control. Servo signals are usually written on a surface, which is called a servo-surface, of a magnetic disk. As one example of closed loop servo control, there is a servo control system having a servo disk which is exclusively used for servo control. This control system is called simply called "servo-surface servo", hereinafter. There is another control system which is also an example of closed loop servo control and is performed using servo data which are stored in a data surface of a data disk instead of using a servo disk as in the case of "servo-surface servo". This control system is called simply "data-surface servo", hereinafter. However, the "servo-surface servo" has been the type of control system used in most magnetic disk apparatuses for a long time.

The present invention can be applied to the "servo-surface servo" type control system.

(2) Description of The Related Art

The data heads in a magnetic disk apparatus are position-controlled so as to be on-track on a data disk during writing or reading, based on the way in which a servo head reads servo signals stored on a servo disk in "servo-surface servo". FIGS. 1 (a) to 1(e) show a group of charts illustrating waveforms successively produced when a servo head reads the servo data stored on the servo disk. Therefore, the transversal direction of this chart represents the direction of circumference of a track and the longitudinal direction of this chart represents the radial direction of the servo disk. In FIGS. 1(a) to 1(e), each chart of a waveform is schematically expressed using triangle wave for simplicity. The group of charts of waveforms (a),(b),(c) and (d) correspond to what are called the normal bits and are produced from adjacent four tracks, respectively. Namely, waveforms (a), (b), (c) and (d) correspond to track 1, track 2, track 3 and track 4 in the data disk, for instance. The waveform (e) corresponds to what is called the index bit which is written in a portion of each track. The signals indicated by CB are clock bits to be used as the standard clock in demodulation of the servo signals and in data writing. The signals indicated by P1 and P2 are positional bits. The positional bit P1 is expressed by two kinds of bit named ODD1 or EVEN1 and the positional bit P2 is likewise expressed by ODD2 or EVEN2, according to their position. Further, the waveform (e) is expressed by a combination of ODD1 and EVEN2 in this case. These four kinds of bits are written periodically in the tracks of the servo disk.

The positioning of the data head on a track of the disk is performed by reading the servo signals from the servo disk by the servo head, demodulating the positional bits (P1 and P2) and detecting the peak level of the P1 and P2.

In the "servo-surface servo", the servo signals are read from the servo disk and the positional bits are demodulated so that the data head is positioned, even when the data head is writing data on the data disk. At that time, electromagnetic noise is generated near the data head. Particularly, noise of a high level is generated when the data is being written as compared with when the data is being read. The high level noise disturbs the demodulation of the positional bits. As the result, the correct reading the servo data becomes impossible. The disturbance by the electromagnetic noise generated from the data head which is nearest to the servo head is most remarkable. The influence of the electromagnetic noise on the demodulating the positional bits is further enhanced due to the following reason. The standard clock for writing data on the data disk (write clock) is usually produced by a phase lock oscillator which is synchronized to the clock for reading the servo signals (servo clock) in order to eliminate the influence of fluctuation of rotational speed of the magnetic disk on detecting the positional bit signals. Therefore, the relationship of phase between the write clock and the servo clock is invariable. As a consequence, the servo signals are synchronized to the electromagnetic noise.

A conventional method for eliminating the influence of electromagnetic noise generated from the data head is to shield the servo head electromagnetically by a shield. However, a space large enough to provide the effective shield is lost as the magnetic disk apparatus becomes smaller according to a recent trend of miniaturization. Moreover, the synchronization between write clock and servo clock becomes indispensable since the magnetic disk apparatus having a high recording density has become common.

Another method for eliminating the influence of electromagnetic noise is published in Japanese laid-open patent publication SHO 58-97164 entitled "A magnetic disk apparatus" by S. Sengoku, Jun., 9, 1983. The method disclosed utilizes a signal processing technique instead of utilizing an electromagnetic shield. However, what is disclosed relates to adjustment of a phase difference between the data writing clock and the servo signal. This is not applicable for the method of writing the servo signals on the servo disk.

A method of writing the servo signals on the servo disk is disclosed in Japanese laid-open patent publication SHO 61-26922 entitled "A magnetic disk apparatus" by T. IWAI and K. NISHIMURA, Feb. 6, 1986. In this method, the electromagnetic noise appears symmetrically on the two positional bit signals which are used for demodulation of the servo signals. For this purpose, the time difference between the two positional bit signals must be an even multiple or about even multiple of period of the write bits. This condition is hardly satisfied for arbitrary stored servo data pattern. That is, the method disclosed is effective for only special servo data patterns to be written. Therefore, a method of eliminating the influence of the electromagnetic noise generated from the data head during writing, while the servo head is reading the arbitrary stored servo data pattern is required.

SUMMARY OF THE INVENTION

An object of the present invention is to improve the positioning control of the data head on the data track of the data disk.

Another object of the present invention is to improve the method of writing the servo data on the servo disk so as to be free from disturbance by electromagnetic noise produced during writing data on the data disk.

Still another object of the present invention is to reduce the production cost of the magnetic disk apparatus.

The object is achieved by writing the servo signals on the servo disk by the servo head so that the positional bits are written shifted as much as the definite quantity within the limit of tolerance of the demodulation gate every servo byte.

That is, a writing apparatus composed of a servo pattern generator, a delay circuit and multiplexers is used to write the servo data on the servo disk. The servo pattern generator generates the clock bits and the positional bits. Based on these bit signals, the pattern of magnetization is written on the servo track of the servo disk. In this case, the positional bit signals are delayed as much as a definite time which is called shift, every servo bite. This shift must be larger than half the width of the waveform of the electromagnetic noise produced during writing the data on the data disk by the data head so that the electromagnetic noise is not superposed on the positional bit signal. On the other hand, the shift must be smaller than the gate time of demodulation of the positional bit signal. The shifted servo data to be written on a servo disk is produced from the multiplexer selecting the quantity of the shift.

When the shift of the positional bits is performed in four steps, for instance, the electromagnetic noise can be synchronized with the positional bit signal one time every four servo bites at most. The peak level of the positional bit is detected by a conventional method. Therefore, the influence of the electromagnetic noise is reduced by one fourth due to leveling over the servo track.

The writing apparatus which writes the shifted write data is used exclusively for production of the servo data on the servo disk and is not set up in the magnetic disk apparatus itself.

DESCRIPTION OF THE PREFERRED EMBODIMENTS

The method of writing servo data on a servo disk embodying the present invention will be described in reference to FIGS. 1 to 11.

Figure 1A:
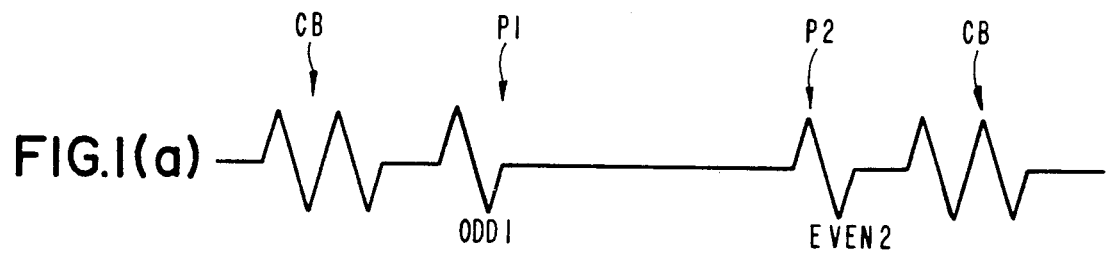
FIGS. 1(a) to 1(e) illustrate a group of charts illustrating schematic waveform of the current flowing in the servo head when the servo data are read.
Figure 1B:
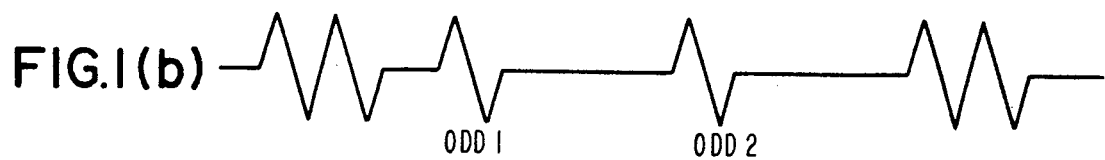
Figure 1C:
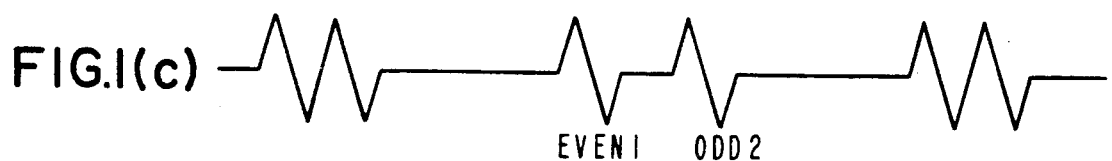
Figure 1D:
Figure 1E:
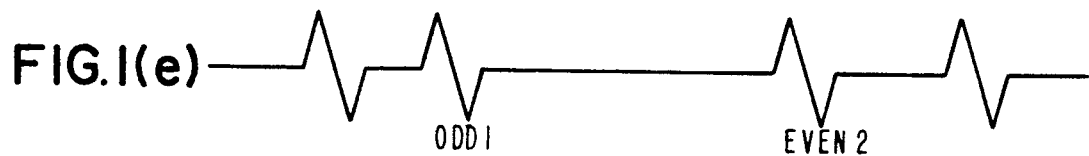
Figure 2:
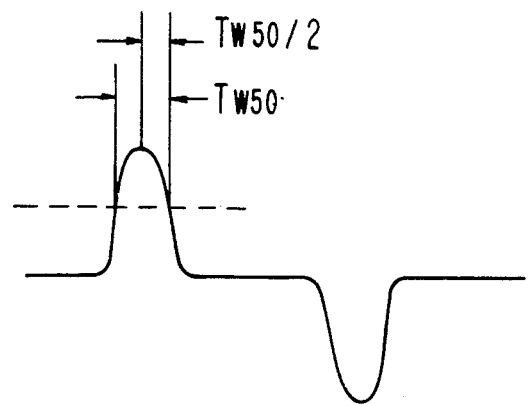
FIG. 2 is a schematic waveform of an electromagnetic noise generated from the data head while date head is writing data on the data disk, and which appears in the current flowing in the servo head when the servo data are read.
Figure 3:
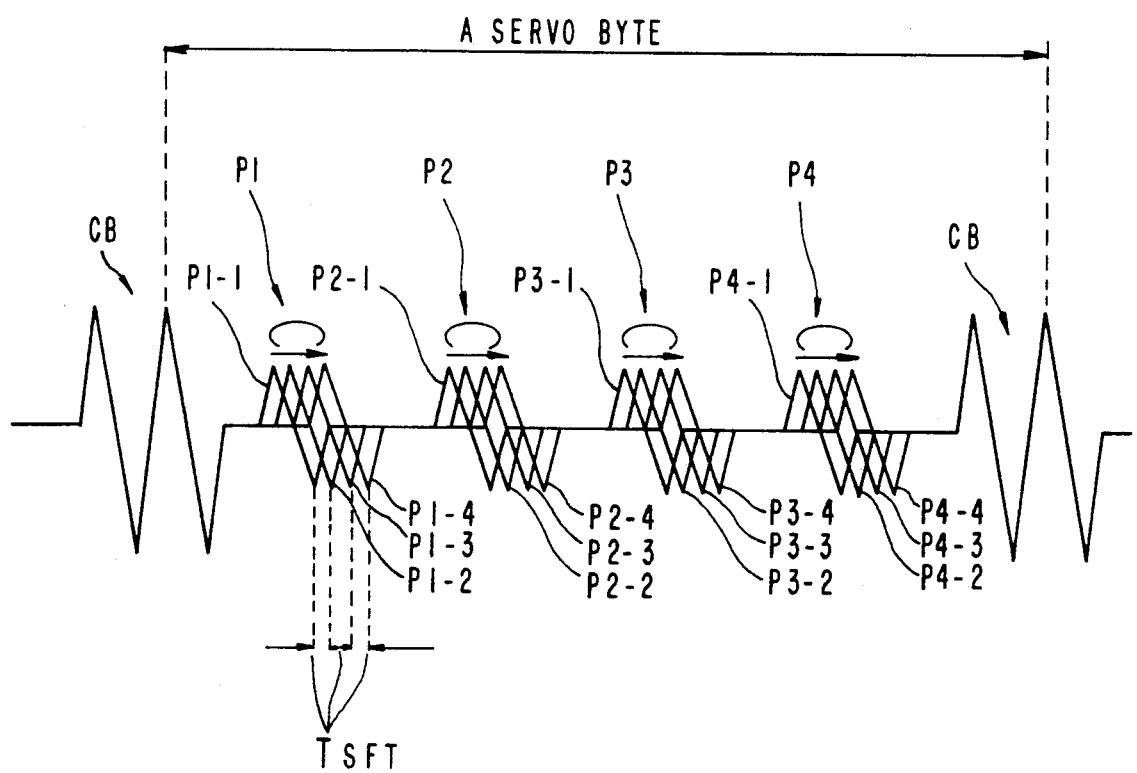
FIG. 3 is a schematic diagram which illustrates the shift of the positional bits using a time chart of one servo byte.

The electromagnetic noise generated from the data head while the data head is writing data on the data disk is schematically illustrated in FIG. 2. The half the width of the waveform of the electromagnetic noise, $(\frac{1}{2})T_{W50}$ is 20 ns in this case. FIG. 3 shows a schematic servo pattern in one servo byte illustrating the four step shift of the positional bit of the present invention. The servo pattern is composed of the four positional bits P1, P2, P3 and P4 which are demodulated to be detected and the clock bit CB which separates the positional bits. When the electromagnetic noise as shown in FIG. 2 is superposed an the positional bit within a range of $\frac{1}{2}(T_{W50})$, the detection of the correct peak level of the positional bit becomes difficult due to enhancement of the amplitude of the positional bit signal by the noise signal. In order to avoid the detection of the positional bit signal from being disturbed by the noise signal, the servo data are previously written on the servo disk as follows so as not to be synchronized with the noise. That is, the positional bit is shifted successively as much as the definite time, $T_{SFT}$, which is more than 20 ns every servo byte in this case. This is illustrated by arrows depicted on the positional bits in FIG. 3. In FIG. 3, the positional bit P1 is composed of four positional bits P1-1, P1-2, P1-3 and P1-4. The positional bits P2, P3 and P4 are composed of P2-1, P2-2, P2-3, and P2-4, P3-1, P3-2, P3-3 and P3-4 and P4-1, P4-2, P4-3 and P4-4, respectively. The positional bits P1-2, P1-3 and P1-4 are shifted $T_{SFT}$, $2T_{SFT}$ and $3T_{SFT}$ from the positional bit P1-1, respectively. The positional bits P2-2, P2-3 and P2-4, the positional bits P3-2, P3-3 and P3-4 and the positional bits P4-2, P4-3 and P4-4 are shifted from the positional bits P2-1, P3-1 and P4-1, respectively, in the same manner as the positional bits P1-2, P1-3 and P1-4 are shifted from the positional bit P1-1. The positional bits P1-1, P2-1, P3-1 and P4-1, the positional bits P1-2, P2-2, P3-2 and P4-2, the positional bits P1-3, P2-3, P3-3 and P4-3 and the positional bits P1-4, P2-4, P3-4 and P4-4 are in the first servo byte, the second servo byte, the third servo byte and the fourth servo byte, respectively.

As described above, the positional signals are written on the servo disk by shifting the positional bits by the definite time every servo byte successively. When this servo disk is used, the electromagnetic noise does not superposed on the positional bit in three of the postional bits of the servo byte, even though the noise is accidentally superposed on the one of the positional bits, in one servo byte.

Figure 4:
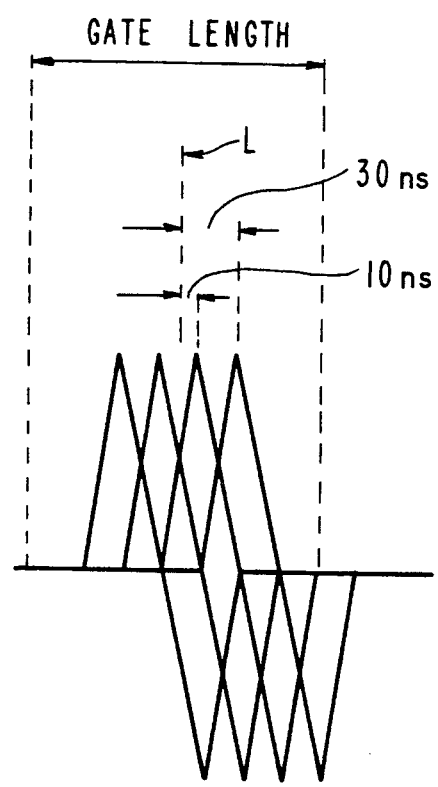
FIG. 4 is an enlarged schematic diagram illustrating the symmetrical shift of the positional bit with respect to the regular position. The limit of tolerance of a gate length (or gate time) for demodulating of the positional bit is indicated by the dotted lines.

In an actual case, the positional bits are shifted symmetrically with respect to the regular position, L, of the positional bit as shown in FIG. 4. FIG. 4 shows the symmetric shift of a positional bit in this embodiment. Taking the positional bit P1 in FIG. 3 as an example, P1-1, P1-2, P1-3 and P1-4 are shifted −30 ns, −10 ns, +10 ns and +30 ns from the regular position L, respectively. In FIG. 4, the limit of tolerance of a gate length (or gate time) for demodulating of the positional bit is indicated by the dotted lines. For the demodulation of the positional bit, the detecting of the peak level is performed by detecting only peak level in positive side or the upper side. The gate length is taken as 160 ns which is ±80 ns with respect to L, in this embodiment. Accordingly, the largest shift of the positional bit from the L can not exceed 80 ns.

When the servo data is being read from the servo disk, on which the shifted positional bits as described above have been written, the level of the electromagnetic noise superposed on the demodulated positional bit can be reduced to lower than one fourth of the level present when the positional bits are not shifted as the conventional case.

Figure 5:
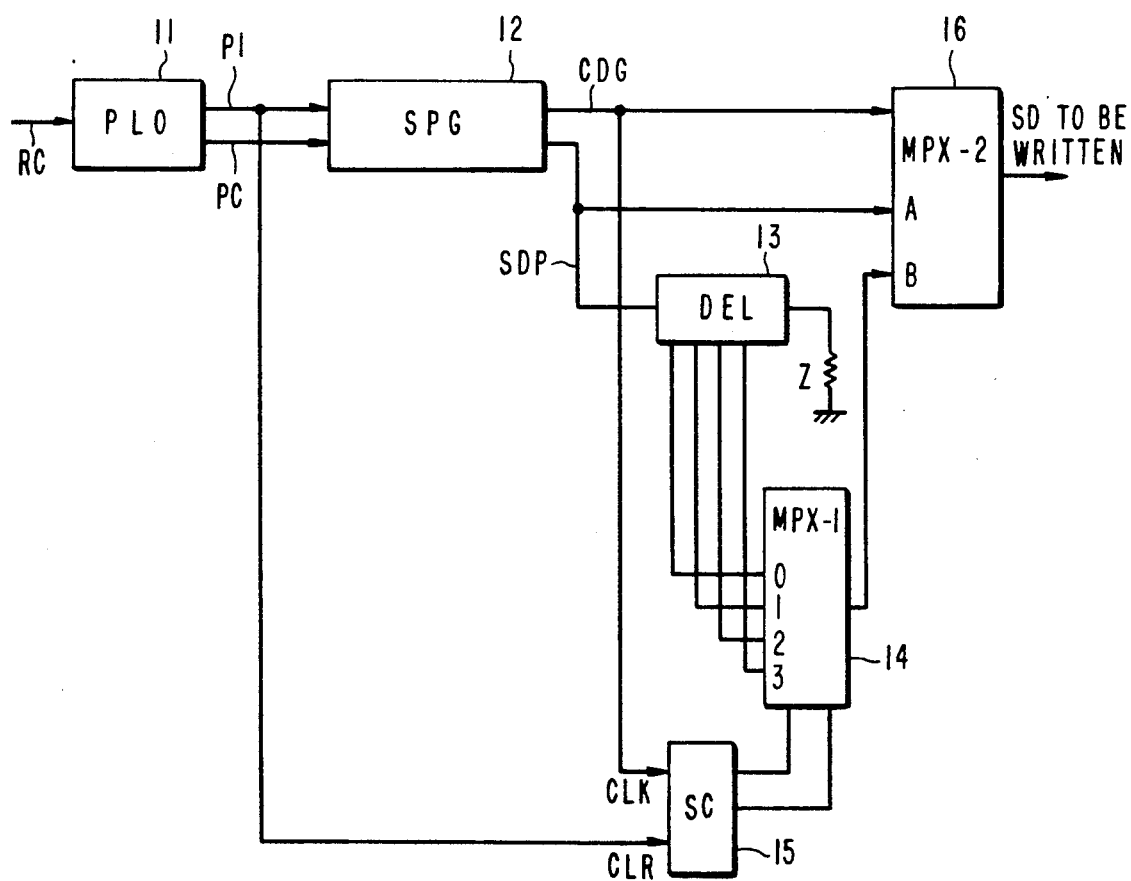
FIG. 5. is a block diagram of a circuit for generating servo data to be written.
Figure 6:
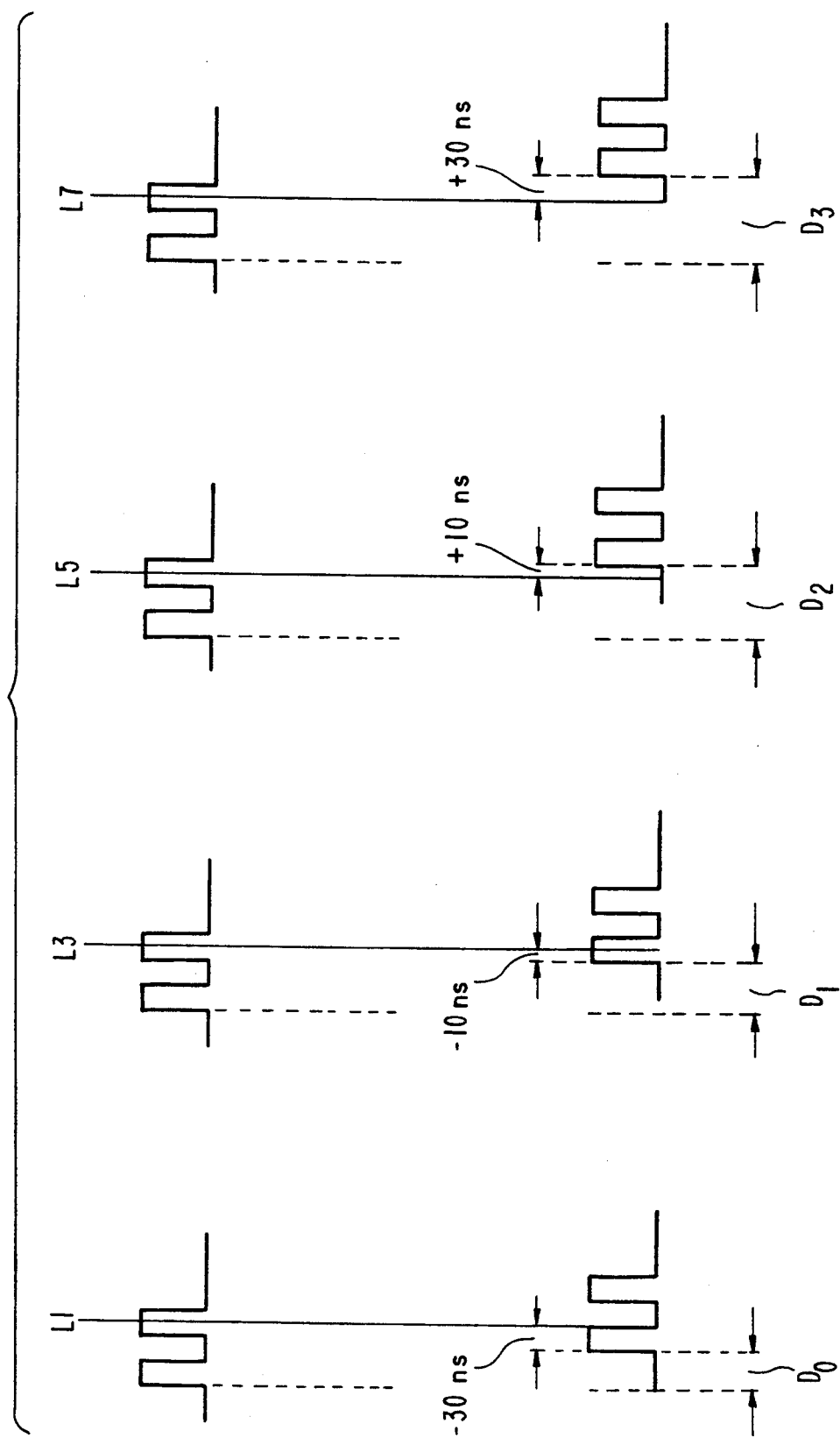
FIG. 6 is a schematic diagram illustrating the delay time and the shift of the positional bit in the first, second, third and fourth servo byte.
Figure 7:
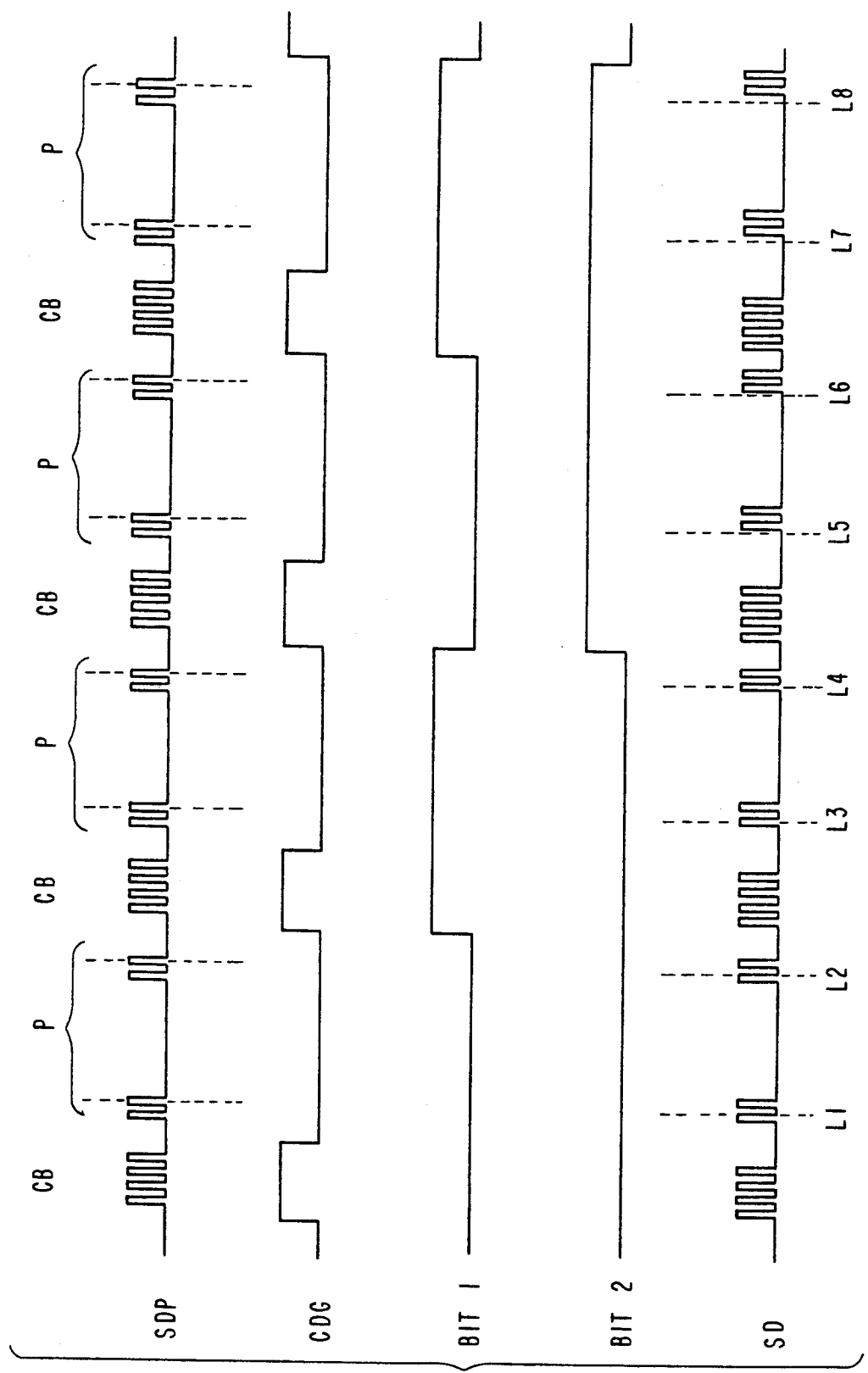
FIG. 7 is the time chart of the bit signals in the circuits for generating the servo data to be written as shown in FIG. 5.
Figure 8:
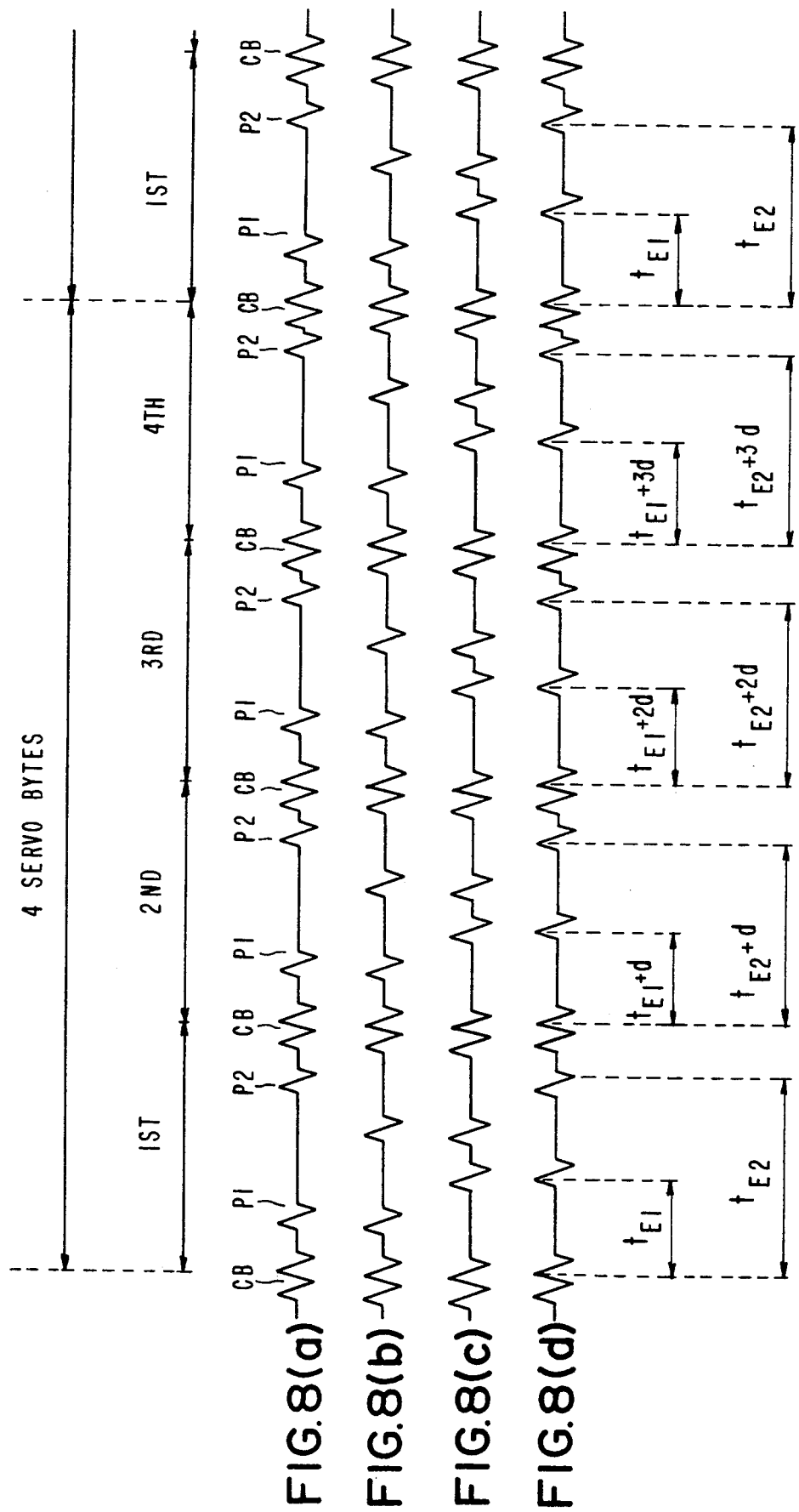
FIG. 8(a) to 8(d) are a group of charts illustrating a schematic waveform of the current flow in the servo head when the servo data of the present invention are read.

Next, a method of producing the shifted positional bits for writing the servo data on the servo disk will be described. FIG. 5 shows a block diagram of circuits for generating the servo data to be written. In FIG. 5, a reference clock (RC) signal, which is a standard clock for the motion along the circumference of the disk previously written on the data disks, is input to a phase locked oscillator (PLO) 11. The phase locked oscillator 11 generates a preindex (PI) signal which is a standard clock of higher grade for motion along the circumference of the servo disk and a pattern clock (PC) signal synchronized with reference clock signal. The PC signal is input to a servo pattern generator (SPG) 12, and the preindex signal is input to the servo pattern generator 12 and a CLR terminal of a shift counter (SC) 15. On the basis of PI and PC signals, the SPG 12 generates a clock data gate (CDG) pulse and an original servo data pattern (SDP) to be written. The CDG pulse is a bit signal of 0 or 1 and separates the clock bit (CB) and the positional bits (P). The SDP is the original serus data pattern to be written for later positioning of the data head. The CDG pulse is input to a second multiplexer (MPX-2) 16 and the CLK terminal of the shift counter 15. The SDP signal is input to the MPX-2 16 and a delay circuit (DEL) 13. A terminator is denoted by Z. In the delayed circuit 13, delay time can be changed by taps for the shifted positional bits. The four kinds of delay time are illustrated in FIG. 6, where the servo pattern is expressed by the pulse indicating the timing of flux reversal. In FIG. 6, the delay time $D_0$, $D_1$, $D_2$ and $D_3$ and the shift of the positional bit from the L in the first, second, third and fourth servo byte are shown schematically. The shift time of the positional bit is the time difference between the regular position, L, and the onset of the positional bit signal. In FIG. 5, the delayed bit signals corresponding to $D_0$, $D_1$, $D_2$ and $D_3$ are output from the delayed circuit 13 and are input to 0, 1, 2 and 3 input terminal of a first multiplexer (MPX-1) 14, respectively. The shift counter 15 counts the CDG pulse output from the servo pattern generator 12 and output bit 1 and bit 2 signals, which are shown in FIG. 7. The bit 1 and bit 2 signals are input to the first multiplexer 14, where the delay time is selected from $D_0$, $D_1$, $D_2$ and $D_3$. The timing of the shift for all adjacent servo tracks is set to the same time in the shift counter 15 by the preindex PI output from the phase locked oscillator 11. The four delayed bit signals $D_0$, $D_1$, $D_2$ and $D_3$ are input to the second multiplexer 16 from the first multiplexer 14. When the CDG pulse is 1, the SDP is input to the terminal A of the second multiplexer 16. When the CDG pulse is 0, the SDP is input to the terminal B of the second multiplexer 16, through the delayed circuit 13 and the first multiplexer 14. Thus, the servo data composed of the clock bit signals and the shifted positional bit signals are output from the second multiplexer 16 to a circuit for writing a servo data (not depicted).

In FIG. 7, the time chart of the bit signals in the circuits for generating the servo data to be written in FIG. 5 are shown. The chart covers four servo bytes from the left to the right in FIG. 7. In FIG. 7, the original servo data pattern to be written (SDP) and the servo data to be written (SD) are expressed by the pulse indicating the timing of flux reversal. The SDP shows the time chart of the original servo data pattern generated from the servo pattern generator 12. The bits CB and P represent the clock bits and the positional bits, respectively. The dotted lines drawn vertically L1, L2, L3, L4, L5, L6, L7 and L8 represent the regular positions of the positional bits. The dotted lines L1 and L2, L3 and L4, L5 and L6, and L7 and L8 are in the first, second, third, and fourth servo bytes, respectively. The CDG shows the chart of the clock data gate pulse generated from the servo pattern generator 12. The bit 1 and bit 2 show the time charts of bit 1 and bit 2 signals generated from the shift counter 15. The shifts of the shifted positional bits in the first, second, third and fourth servo bytes correspond the bit 1 and bit 2 signals of 00, 01, 10 and 11, respectively. The servo data (SD) to be written which is output from the second multiplexer 16 shows the current pattern flowing in the servo head when the servo data are written on the servo disk. The SD of the four servo byte is written periodically along the servo track.

FIGS. 8(a) to 8(d) show a schematic time chart of waveform of five servo bytes successively produced when a servo head reads the servo data stored in the servo disk which had been written using the output from the MPX-2 16 shown in FIG. 5. FIG. 8(a) is the time chart of waveform corresponding to the SD in FIG. 7. The positional bit signals, P1 and P2, in FIG. 8(a) correspond to ODD1 and EVEN2, respectively. The positional bit signals in FIGS. 8(b), 8(c) and 8(d) correspond ODD1 and ODD2, EVEN1 and ODD2 and EVEN1 and EVEN2, respectively. Taking FIG. 8(d) as an example, the time of EVEN1 in the first servo byte is supposed to be $t_{E1}$. Then, the time of EVEN1 in the second, the third, the fourth and the fifth servo byte is $t_{E1}+d$, $t_{E1}+2d$, $t_{E1}+3d$ and $t_{E1}$, respectively. The d is the time difference between corresponding positional bit signals in the two adjacent servo bytes. That is, the time of EVEN1 in the four servo bytes forms an arithmetic progression whose the initial term is $t_{E1}$ and the common difference is d. The next four bytes repeat the previous four bytes periodically. In the same way, the time of EVEN2 in the first, the second, the third, the fourth and the fifth servo byte is $t_{E2}$, $t_{E2}+d$, $t_{E2}+2d$, $t_{E2}+3d$ and $t_{E2}$, respectively. The servo data corresponding the time chart in FIGS. 8(a) to 8(d) are stored an the servo disk. When the servo data are read by the servo head, positioning of the data head is carried out.

In this embodiment, four step shift of the positional bit is described as an example. However, the number of steps for shifting is not necessarily four, so far as the d is larger than $(\frac{1}{2})T_{W50}$ and that d times the number of steps for shifting is smaller than the gate length of the gate pulse in which the positional bit is demodulated.

Figure 9:
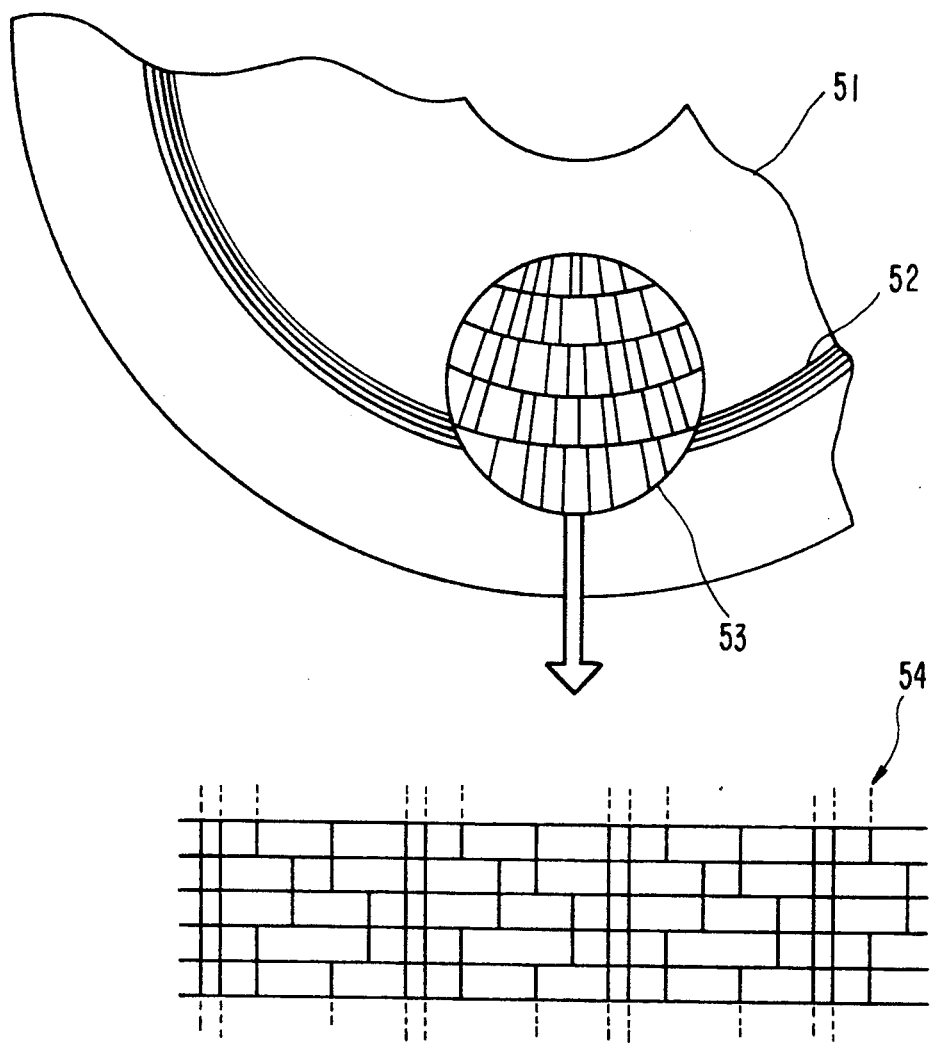
FIG. 9 is a schematic partial drawing of a servo disk storing servo data of the present invention.

FIG. 9 shows schematically a part of the servo track on the servo disk, which is a magnetic recording media. The upper part of FIG. 9 shows a part of the servo disk 51, on which a lot of servo tracks 52 are provided in the direction of circumference of the servo disk. The servo data are stored in the form of magnetic flux reversal in the magnetic medium on the servo track. A pattern 54 corresponding to the pattern shown in FIGS. 8(a) to 8(d) can be seen through a microscope 53 as illustrated in the lower part of FIG. 9. In the pattern 54, horizontal direction and vertical direction represent the direction of circumference and the direction of a radius of the servo disk, respectively. Each vertical line represents the position of magnetic flux reversal in the magnetic medium on the servo track, schematically.

Figure 10:
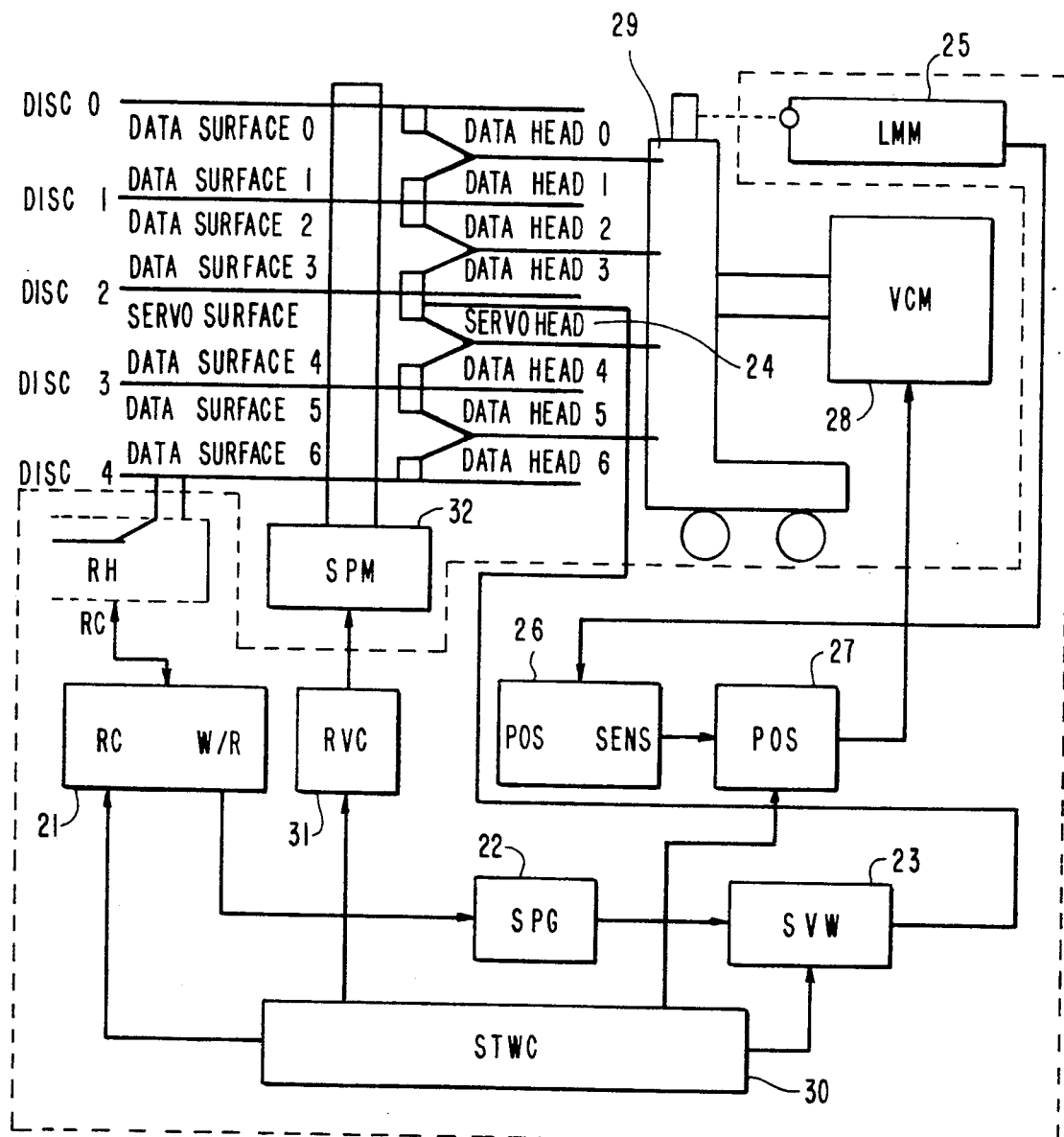
FIG. 10 is a block diagram of an apparatus writing servo data on a servo disk in a conventional magnetic disk apparatus.

In FIG. 10, an apparatus writing servo data on the servo disk in a conventional magnetic disk apparatus is shown schematically with a block diagram. In FIG. 10, the circuits and components in an area surrounded by a dotted line constitute the apparatus for writing servo data on the servo disk. The other circuits and components belong to the conventional magnetic disk apparatus. The magnetic disk apparatus has five magnetic disks as an example, namely Disk 0, 1, 2, 3 and 4 which can be rotated by a spindle motor (SPM) 32, whose number of revolution is controlled by a circuit (RVC) 31 for controlling the number of revolution, driven by a circuit (STWC) 30 for controlling the apparatus for writing servo data. Seven surfaces of the five magnetic disks are used as data surfaces and one surface is used as a servo surface. The servo data are written on the servo surface by a servo head 24. The reference clock obtained by a reference head (RH) from the rear surface of the Disk 4 is input to the circuit (SPG) 22 for generating a servo pattern data as shown in FIG. 5, through a circuit (RC W/R) 21 for writing and reading reference clock. The servo data pattern to be written, output from the circuit 22 for generating a servo pattern data as shown in FIG. 5, is input to a circuit (SVW) 23 for writing the servo data. Amplified write signals drive the servo head 24 and the servo pattern data is written on the servo surface of the servo disk 2 indicated in FIG. 10. In this stage, the positioning of the servo head 24 is performed by a head positioner 29 driven by a voice coil motor (VCM) 28, through a circuit (POS SENS) 26 for detecting position and a circuit (POS) 27 for positioning using a length measuring machine 25 by a laser.

Figure 11:
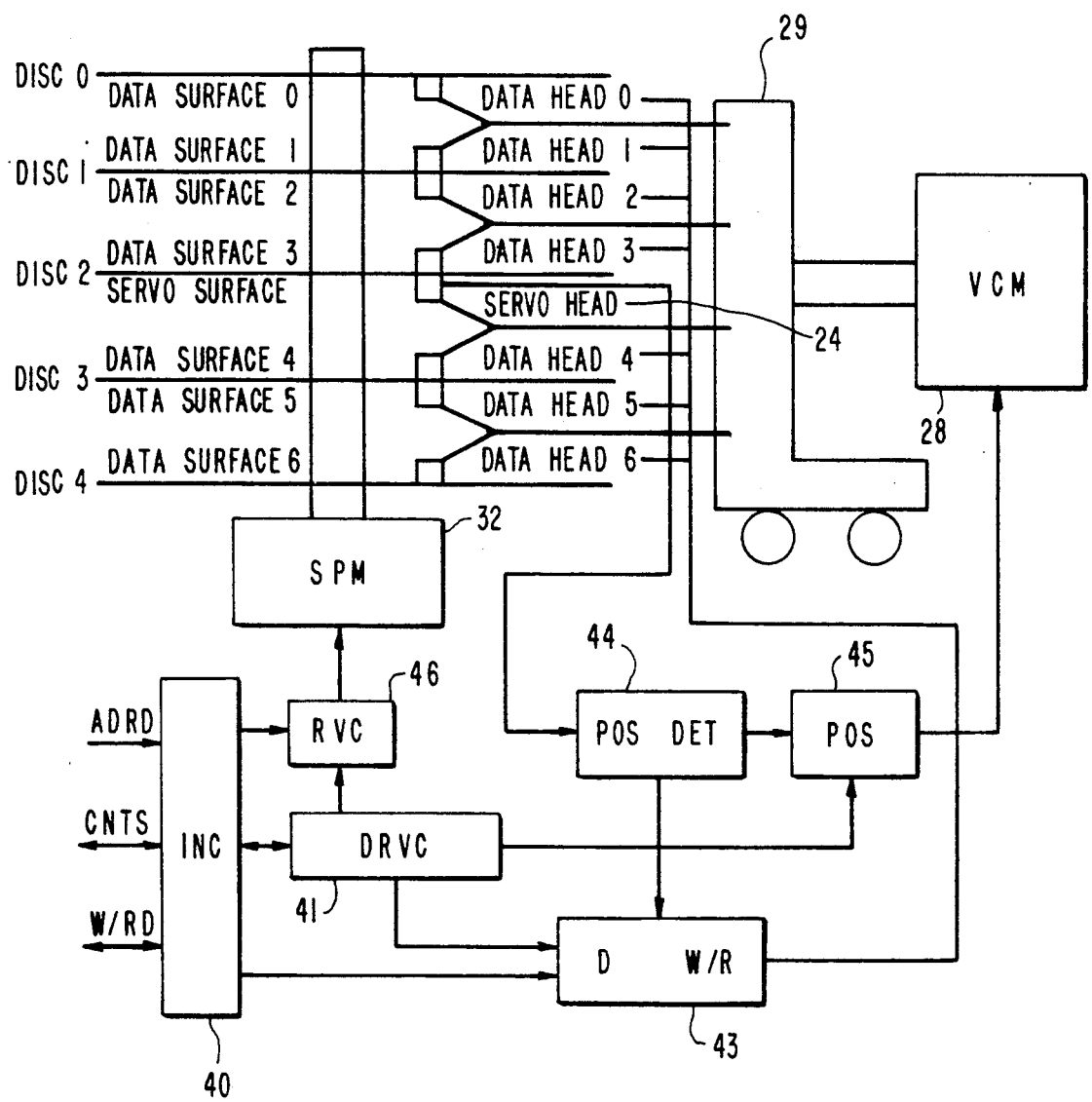
FIG. 11 is a block diagram of a conventional magnetic disk apparatus having a servo disk storing servo data of the present invention.

In FIG. 11, a block diagram of a magnetic disk apparatus which is exhibited partly in FIG. 10 is shown schematically. In FIG. 11, the same reference numbers as in FIG. 10 designate the same components as in FIG. 10. This magnetic disk apparatus is a conventional apparatus except having the servo disk, on which the servo data had been written by the apparatus described in FIG. 10. In the same way as in FIG. 10, the magnetic disk can be rotated by a spindle motor 32 driven by a circuit (DRVC) 41 for controlling the apparatus through a circuit (RVC) 46 for controlling the number of revolution. An interface circuit (INC) 40 receive write or read data (W/R D), control signals (CNTS) and address data (ADRD) from a controller, which is not depicted. The data are written on the data surfaces of the data disks and the data stored in data surfaces of the data disks are read by a data head, through a circuit (D W/R) 43 for writing and reading data. While, the servo signals produced when the servo data are read by a servo head 24 are demodulated by a circuit (POS DEM) 44 for demodulating the positional bit signals and input to a circuit 45 for positioning the data head. The output of the circuit (POS) 45 for positioning drives a head positioner 29 by a voice coil motor 28 to position the data head on a designated track on the data surface.

The many features and advantages of the invention are apparent form the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A method for writing servo data using a data writing head unit to a servo data recording medium of magnetic data recording unit in accordance with a train of clock bits, the servo data including a standard clock bit being one of the clock bits and positional bit signals for positioning the data writing head unit, said method comprising of steps of:

(a) generating a predetermined number of servo bytes, the servo bytes including a standard servo byte and a plurality of succeeding servo bytes following after the standard servo byte, the standard servo byte includes the standard clock bit and a plurality of the positional bit signals set in the standard servo byte with a standard time space from the standard clock bit, and one of the succeeding servo bytes includes the standard clock bit and the positional bit signals set in the one of the succeeding servo bytes with a predetermined time space from the standard clock bit, the predetermined time space consists of the standard time space and at least one predetermined delay time; and (b) writing the predetermined number of servo bytes generated in step (a) to the servo data recording medium as the servo data.

2. A method according to claim 1, wherein the predetermined delay time is at least half of a width of electromagnetic noise which would appear when the servo data are read from the servo data recording medium, and the predetermined delay time is smaller than a length of a gate pulse in which the servo data are demodulated, and wherein the predetermined number of servo bytes is at most a numerical value obtained by dividing the gate length by the predetermined delay time.

3. A method for writing servo data to a servo disk of a magnetic recording apparatus, said servo data including at least one clock bit and positional bit signals, said method comprising the steps of:

(a) generating a standard servo byte including the clock bit and the positional bit signals set in the standard servo byte a standard time space form the clock bit;

(b) generating a predetermined number of succeeding servo bytes following after the standard servo byte, each of the succeeding servo bytes includes the clock bit and the positional bit signals;

(c) delaying the positional bit signals in the succeeding servo bytes so that the time of a corresponding positional bit signal of the positional bit signals forms an arithmetic progression whose initial term is the standard time space of the corresponding positional bit signal in the standard servo byte and a common difference for each of the succeeding servo bytes is a predetermined time delay, each of the succeeding servo bytes being progressively delayed from a previous servo byte by the predetermined time delay; and (d) generating periodically a servo byte group including the standard servo byte and the succeeding servo bytes.

4. A method according to claim 3, wherein the predetermined time delay is at least half of a width of electromagnetic noise which would appear when the servo data are read from the servo data recording medium, and the predetermined time delay is smaller than a length of a gate pulse in which the servo data are demodulated, and wherein the predetermined number of servo bytes in the servo byte group is at most a numerical value obtained by dividing the length of the gate pulse by the predetermined time delay.

5. A servo data recording medium storing data having a plurality of servo bytes, each servo byte including a clock bit and a plurality of positional bit signals used for positioning a data writing head unit, said servo data recording medium comprising:

a periodical data pattern having a periodically repeated servo byte group including a standard servo byte and a plurality of succeeding servo bytes following after the standard servo byte; and a data sub-pattern in each of the repeated servo byte group so that the standard servo byte includes the clock bit and the positional bit signals set in the standard servo byte a standard time space from the clock bit, and one of the succeeding servo bytes includes the clock bit and the positional data set in the one of said succeeding servo bytes with a predetermined time space from the standard clock bit, the predetermined tie space consists of the standard time space and a predetermined delay time;

wherein the positional bits of the succeeding servo bytes of the sub-pattern form an arithmetic progression whose initial term is the standard time space of the positional bits in the standard servo byte and a common difference for each of the succeeding servo bytes is the predetermined time delay, each of the succeeding servo bytes being progressively delayed from a previous servo byte by the predetermined time delay.

6. A method according to claim 5, wherein the predetermined time delay is at least half of a width of electromagnetic noise which would appear when the servo data are read from the servo data recording medium, and the predetermined time delay is smaller than a length of a gate pulse in which the servo data are demodulated, and wherein the number of servo bytes in the servo byte group is at most a numerical value obtained by dividing the length of the gate pulse by the predetermined time delay.

7. An apparatus for writing servo data having a plurality of servo bytes, each servo byte including a clock bit and a plurality of positional bit signals said apparatus comprising:

means for generating a standard servo byte including the clock bit and the positional bit signals set in the standard servo byte a standard time space from the clock bit, and for generating a predetermined number of succeeding servo bytes following after the standard servo byte, each of the succeeding servo bytes includes the clock bit and the positional bit signals;

means for delaying the positional bit signals in the succeeding servo bytes so that the time of a corresponding positional bit signal of the positional bit signals forms an arithmetic progression whose initial term is the standard time space of the corresponding positional bit signal in the standard servo byte and a common difference for each of the succeeding servo bytes is a predetermined time delay, each of the succeeding servo bytes being progressively delayed from a previous servo byte by the predetermined time delay; and means for generating periodically a servo byte group consisting of the standard servo byte and the succeeding servo bytes.

8. An apparatus for writing servo data according to claim 7, wherein the predetermined time delay is at least half of a width of electromagnetic noise which would appear when the servo data are read from the servo data recording medium, and the predetermined time delay is smaller than a length of a gate pulse in which the servo data are demodulated, and wherein the number of servo bytes in the servo byte group is at most a numerical value obtained by dividing the gate length by the predetermined time delay.

9. An apparatus for writing servo data according to claim 8, wherein the predetermined time delay is twenty nanoseconds.

10. An apparatus for writing servo data according to claim 7, wherein the number of servo bytes in the servo byte group is four.

11. A servo-disk, comprising:

a plurality of tracks;

a plurality of servo-data patterns, each servo-pattern representing at least one of said plurality of tracks, each of said plurality of servo-data patterns includes a predetermined number of offset servo-data subpatterns repeated a plurality of times, each of said servo-data subpatterns includes at least one clock bit and at least one position bit offset from the clock bit according to a predetermined schedule, each of said servo-data subpatterns are respectively offset from each other by a shift amount.

12. A servo-disk according to claim 11, wherein according to the predetermined schedule each of the servo-data subpattern has the at least one clock bit and the at least one bit position bit offset from the clock bit by a modified amount, and wherein the modified amount is a regular amount shifted by an offset amount, both the shift amount and the offset amount are substantially less than the regular amount.

13. A servo-disk according to claim 11, wherein the shift amount is approximately twenty nanoseconds, wherein the predetermined number of said servo-data subpatterns is four, and wherein said servo-data includes two position bits.

14. A method for writing servo-data on a servo-disk having a plurality of tracks, the servo-data including at least one clock bit and at least one position bit signal, said method comprising the steps of:

(a) generating a plurality of servo-data patterns, each servo-pattern representing at least one of the plurality of tracks, each of the plurality of servo-data patterns includes a predetermined number of offset servo-data sub-patterns repeated a plurality of times, each of the servo-data subpatterns includes at least one clock bit and at least one position bit offset from the clock bit according to a predetermined schedule, and each of said servo-data subpatterns are respectively offset from each other by a shift amount; and (b) writing the plurality of servo-data patterns to the servo-disk as the servo-data.

15. A method according to claim 14,
wherein according to the predetermined schedule each of the servo-data subpatterns has the at least one clock bit and the at least one bit position bit offset from the clock bit by a modified amount, and
wherein the modified amount is a regular amount shifted by an offset amount, both the shift amount and the offset amount are substantially less than the regular amount.

16. A method for writing servo-data on a servo-disk having a plurality of tracks, the servo-data including at least one clock bit and at least one position bit signal offset from the clock bit by a regular amount, said method comprising the steps of:
 (a) generating a plurality of servo-data patterns, each servo-pattern representing at least one of the plurality of tracks;
 (b) generating a predetermined number of offset servo-data sub-patterns repeated a plurality of times for each of the plurality of servo-data patterns, each of the servo-data subpatterns includes the at least one clock bit and the at least on position bit offset form the clock bit by a modified amount, the modified amount differs for each of the servo-data subpatterns by a shift amount, and each of said servo-data subpatterns are respectively offset from each other by the shift amount; and
 (c) writing the predetermined number of offset servo-data sub-patterns repeatedly a plurality of times to the servo-disk as the servo-data.

17. A method according to claim 16,
wherein said generating in step (b) comprises the step of shifting the position of the position bit from the regular amount by an offset amount, and
wherein both the shift amount and the offset amount are substantially less than the regular amount.

18. A method according to claim 16,
wherein the shift amount is approximately twenty nonoseconds,
wherein the predetermined number of said servo-data subpatterns is four, and
wherein said servo-data includes two position bit signals.

19. An apparatus for writing servo data on a servo-disk having a plurality of tracks, the servo-data including at least one clock bit and at least one position bit signal, said apparatus comprising:
 means for generating a plurality of servo-data patterns, each servo-pattern representing at least one of the plurality of tracks, each of the plurality of servo-data patterns includes a predetermined number of offset servo-data sub-patterns repeated a plurality of times, each of the servo-data subpatterns includes at least one clock bit and at least one position bit offset from the clock bit according to a predetermined schedule, and each of said servo-data subpatterns are respectively offset form each other by a shift amount; and
 means for writing the plurality of servo-data patterns to the servo-disk as the servo-data.

20. An apparatus according to claim 19,
wherein according to the predetermined schedule each of the srvo-data subpatterns has the at least one clock bit and the at least one bit position bit offset from the clock bit by a modified amount, and
wherein the modified amount is a regular amount shifted by an offset amount, both the shift amount and the offset amount are substantially less than the regular amount.

21. A servo disk comprising:
a plurality of tracks; and
a plurality of servo-data patterns, each of said servo-data patterns representing at least one of said plurality of tracks,
each of said plurality of servo-data patterns including a predetermined number of servo-data subpatterns repeated a plurality of times,
each of said servo-data subpatterns including at least one clock bit and at least one position bit offset from the clock bit by an offset amount,
the offset amounts for at least one pair of adjacent said servo-data subpatterns being different by a shift amount.

22. A magnetic disk drive apparatus for recording and reading data on and from a magnetic disk, comprising:
 a servo disk including
  a plurality of tracks; and
  a plurality of servo-data patterns, each of said servo-data patterns representing at least one of said plurality of tracks,
  each of said plurality of servo-data patterns including a predetermined number of servo-data sub-patterns repeated a plurality of times,
  each of said servo-data subpatterns including at least one clock bit and at least one position bit offset for the clock bit by an offset amount,
  the offset amounts for at least one pair of adjacent said servo-data subpatterns being different by a shift amount.

23. A method for positioning a magnetic head, comprising the steps of:
 reading a servo disk having a plurality of tracks and having a plurality of servo-data patterns, each of the servo-data patterns representing at least one of the plurality of tracks, each of the plurality of servo-data patterns including a predetermined number of servo-data subpatterns repeated a plurality of times, each of the servo-data subpatterns including at least one clock bit and at least one position bit offset from the click bit by an offset amount, the offset amounts for at least one pair of adjacent said servo-data subpatterns being different by a shift amount; and
 moving the magnetic head based on the servo-data patterns read from said servo disk.

* * * * *

UNITED STATES PATENT AND TRADEMARK OFFICE
CERTIFICATE OF CORRECTION

PATENT NO. : 5,165,082

DATED : NOVEMBER 17, 1992

INVENTOR(S) : KAZUNOBU TOMIYAMA

It is certified that error appears in the above-identified patent and that said Letters Patent is hereby corrected as shown below:

Title page:Item [73] Assignee: "Jujitsu" should be --Fujitsu--.

Col. 1, line 12, "an" should be --on--;
       line 18, "called" (second occurrence) should be deleted.

Col. 3, line 47, "date" should be --the data--;
       line 60, "written." should be --written;--.

Col. 4, line 28, "an" should be --on--.

Col. 5, line 40, "serus" should be --servo--;
       line 61, "output" should be --outputs--.

Col. 6, line 61, "an" should be --on--.

Col. 8, line 7, "form" should be --from--;
       line 58, "form" should be --from--.

Col. 9, line 38, "tie" should be --time--;
       line 62, "signals" should be --signals,--.

UNITED STATES PATENT AND TRADEMARK OFFICE
CERTIFICATE OF CORRECTION

PATENT NO. : 5,165,082  Page 2 of 2
DATED : NOVEMBER 17, 1992
INVENTOR(S) : KAZUNOBU TOMIYAMA It is certified that error appears in the above-identified patent and that said Letters Patent is hereby corrected as shown below:

Col. 11, line 33, "on" should be --one--;
        line 34, "form" should be --from--.

Col. 12, line 10, "srvo-data" should be --servo-data--;
        line 44, "for" should be --from--;
        line 58, "click" should be --clock--.

Signed and Sealed this

Twenty-sixth Day of October, 1993

Attest:

BRUCE LEHMAN

Attesting Officer    Commissioner of Patents and Trademarks